United States Patent
Bérubé et al.

(10) Patent No.: US 6,733,125 B2
(45) Date of Patent: May 11, 2004

(54) MULTI-FOCAL CONTACT LENS (75) Inventors: André Bérubé, Quebec (CA); Claude Lapalme, Québec (CA)

(73) Assignee: André Berube, Charlesbourg (CA)

( * ) Notice: Subject to any disclaimer, the term of this patent is extended or adjusted under 35 U.S.C. 154(b) by 0 days.

(21) Appl. No.: 10/131,529

(22) Filed: Apr. 25, 2002

(65) Prior Publication Data
US 2003/0202155 A1 Oct. 30, 2003

(51) Int. Cl.⁷ .................................................. G02C 7/04
(52) U.S. Cl. ...................................................... 351/161
(58) Field of Search ................... 351/160 R, 160 H, 351/161, 162, 177

(56) References Cited

U.S. PATENT DOCUMENTS

| | | |
|---|---|---|
| 3,270,099 A | 8/1966 | Camp |
| 3,472,581 A | 10/1969 | Bronstein |
| 3,614,217 A | * 10/1971 | Bronstein .................. 351/161 |
| 5,080,472 A | * 1/1992 | Gupta ....................... 359/652 |
| 5,142,411 A | 8/1992 | Fiala |
| 6,217,171 B1 | 4/2001 | Auten et al. |

FOREIGN PATENT DOCUMENTS

FR 1295294 12/1962

* cited by examiner

Primary Examiner—Scott J. Sugarman
(74) Attorney, Agent, or Firm—Ogilvy Renault; James Anglehart (57) ABSTRACT

The contact lens has a fused construction with improved comfort, reduced optical distortions, such as halos, reduced discontinuities, and improved mechanical stability. The lens has an inside portion extending from a periphery of the lens over a concave side of the lens, and a second central exterior portion fused to the first portion. A central zone provides a first optic power and a first concentric band providing a second optic power. A central interface between the first and second portions has a curvature substantially the same as a curvature of the concave side. The second portion forms a junction with the first portion on a convex side of the lens substantially outside of a field of view of a user's eye. A transition profile between the junction and the central interface determines, along with the first and the second indices of refraction, the second optic power.

11 Claims, 7 Drawing Sheets

FIG_1

FIG_2

FIG_3

FIG_4

FIG_5

MULTI-FOCAL CONTACT LENS

FIELD OF THE INVENTION

The present invention relates to contact lenses, and more particularly to a multi-focal or bifocal contact lens made of two fused materials.

BACKGROUND OF THE INVENTION

Multi-focal contact lenses are known in the art. Multi-focal contact lenses typically have concentric bands of different diopters. People then choose to see the image associated with the diopter suitable for the distance of the object. While some discomfort may be encountered when using single focal contact lenses, multi-focal lenses are known to cause discomfort more frequently. The reasons for the increase in difficulties are largely related to the discontinuities between the portions of the contact lens for near vision and the portions of the contact lens for far vision. These discontinuities can create irritations on the eye surface, or irritations on the eyelid, or trap impurities that may lead to infection, as well as optical distortions such as the presence of halos, etc. The optical distortions lead to eyestrain and fatigue.

Fused contact lenses are also known in the art and allow two materials having different indices of refraction to be used in the construction of the bands or zones. The fused construction may allow for smaller differences in curvature between bands and thus reduce discontinuities. However, the junction between fused materials may lead itself to a discontinuity or distortion in the shape of the lens under varying conditions.

SUMMARY OF THE INVENTION

It is an object of the present invention to provide a contact lens having a fused construction that has improved comfort, reduced optical distortions such as halos or the like, or reduced discontinuities, particularly in low light or night vision conditions.

It is an object of the invention to provide a contact lens having a fused construction with improved mechanical stability under varying conditions during use.

It is also an object of the invention to provide a method of manufacturing a fused multi-focal contact lens.

According to the invention, there is provided a fused multi-focal contact lens comprising a first portion having a first index of refraction and extending from a periphery of the lens over a concave side of the lens, and a second portion fused to the first portion and having a second index of refraction different from the first index of refraction. The lens comprises a central zone providing a first optic power and a first concentric band providing a second optic power. A central interface between the first portion and the second portion has a curvature substantially the same as a curvature of the concave side such that a thickness of the first portion within the central zone is substantially constant. The second portion forms a junction with the first portion on a convex side of the lens substantially outside of a field of view of a user's eye. A transition profile between the junction and the central interface determines, along with the first and the second indices of refraction, the second optic power.

According to the invention, there is also provided a fused multi-focal contact lens comprising a first portion having a first index of refraction, a second portion fused to the first portion and having a second index of refraction different from the first index of refraction. The lens comprises a central zone providing a first optic power and a first concentric band providing a second optic power. A central interface between the first portion and the second portion within the central zone having a curvature substantially the same as a curvature of the concave side such that a thickness of one of the first and second portions is substantially constant, whereby the mechanical properties of the lens are more stable. The second portion forms a junction with the first portion substantially outside of a field of view of a user's eye. A transition profile between the junction and the central interface determines, along with the first and the second indices of refraction, the second optic power.

According to the invention, there is also provided a fused multi-focal contact lens comprising a first portion having a first index of refraction, a second portion fused to the first portion and having a second index of refraction different from the first index of refraction. The lens comprises a central zone providing a first optic power and a first concentric band providing a second optic power. The lens comprises a central zone providing a first optic power and a first concentric band providing a second optic power. An interface between the first portion and the second portion extending substantially across all of the lens and having within the concentric band a curvature substantially the same as a curvature of the concave side such that a thickness of one of the first and second portions is substantially constant, whereby the mechanical properties of the lens are more stable. The interface having a change in curvature at a junction between the central zone and the concentric band wherein a profile of the interface within the central zone determines, along with the first and the second indices of refraction, the first optic power.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

The exemplary preferred embodiment is a contact lens for correction farsightedness or presbyopia. It will be appreciated by those skilled in the art that the present invention can be used to correct a variety of vision problem.

As shown in FIGS. 1 to 4, a block of polymer A having an index of refraction of 1.51 is provided. Block B has a different index of refraction, namely 1.46. The polymer for both blocks A and B is chosen for its gas permeability and wetability properties in addition to the desired index of refraction. Examples of suitable polymers are given hereinbelow. The blocks A and B are first polymerized, and then machined.

Figure 1:
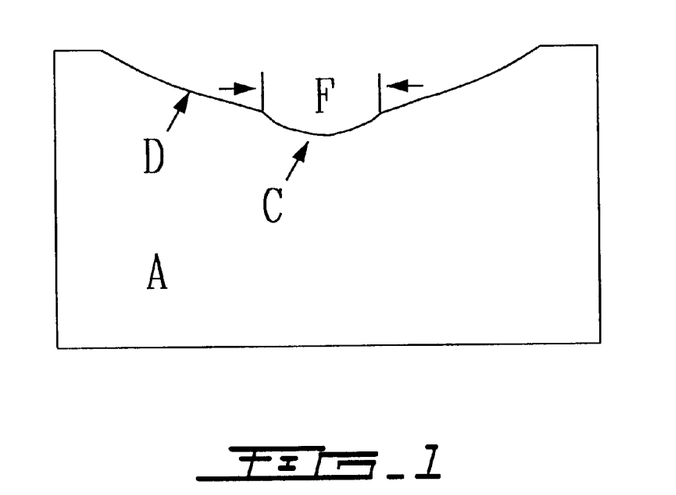
FIG. 1 illustrates a cross-section of a block of polymer material cut to provide a transition surface and a central interface surface according to the preferred embodiment.
Figure 2:
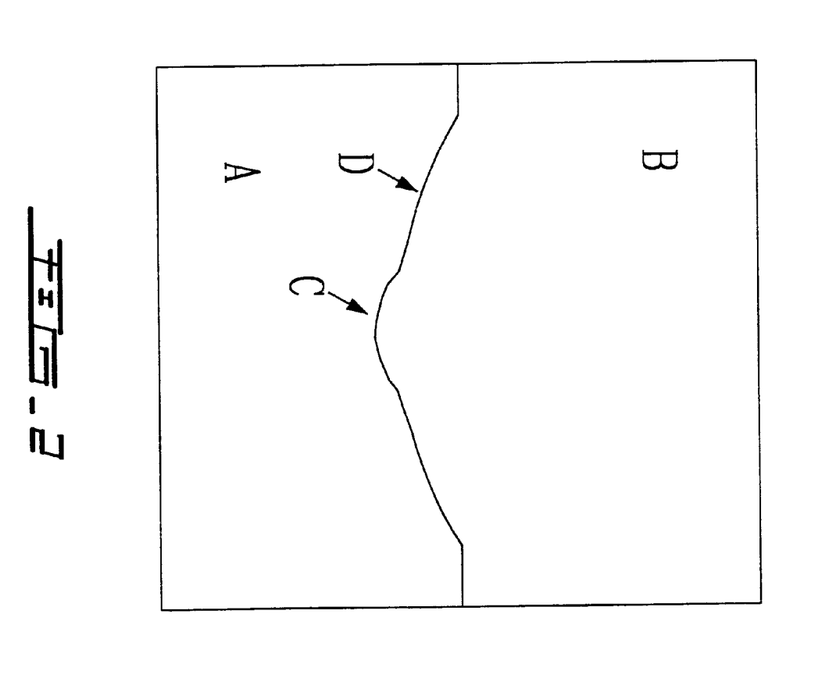
FIG. 2 illustrates the block of FIG. 1 with another block of polymer material having a different index of refraction fused thereto.

Within block A, as shown in FIG. 1, two profiles C and D are cut in the block A using a programmable lathe. Of course, block A can also be manufactured by molding or other suitable techniques. Both the curvature of the surface C and surface D are exaggerated in FIGS. 1 and 2 as compared to FIGS. 3 and 5. The interface surface C is given a radius of curvature that will match the radius of curvature of the concave curved side (J in FIG. 3) of the contact lens fitting on the surface of the eye within the region F defining the first optical power. The optical power of the central zone C is defined by the difference in the radii of curvature of the surfaces J and H (see FIGS. 3 and 4) and the index of refraction of the block A. The index of refraction of block B does not contribute to the power of the central zone A because the curvature of J and C is substantially the same. However, the thin layer of block B (approximately 0.05 mm) extending over the surface of zone C is important for mechanical stability of the lens and it eliminates the need for any junction in this zone.

Figure 3:
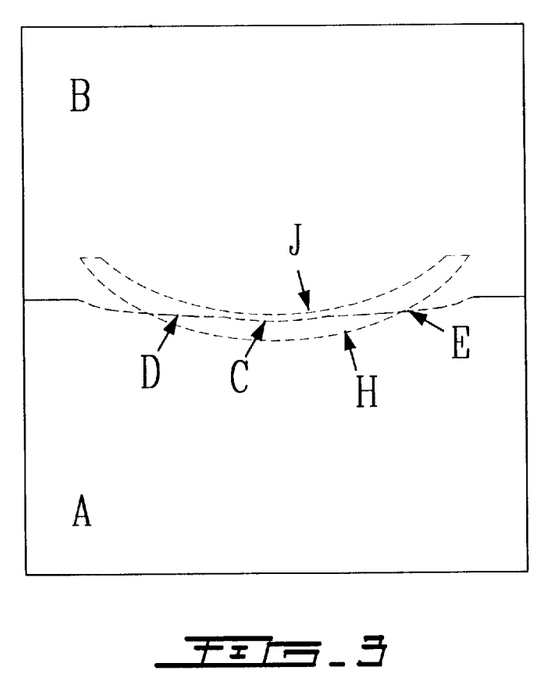
FIG. 3 illustrates a cross-section of the fused block of FIG. 2 with the cross-sectional shape of the final contact lens shown in dotted lines.
Figure 4:
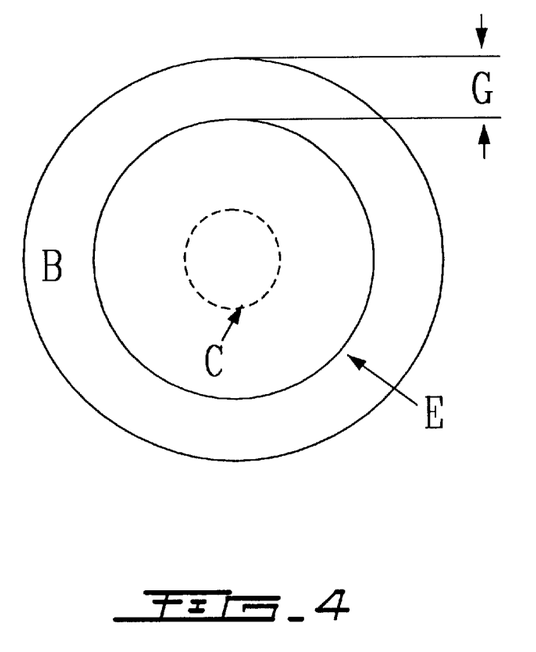
FIG. 4 is a plan view of the cut contact lens according to the preferred embodiment.
Figure 5:
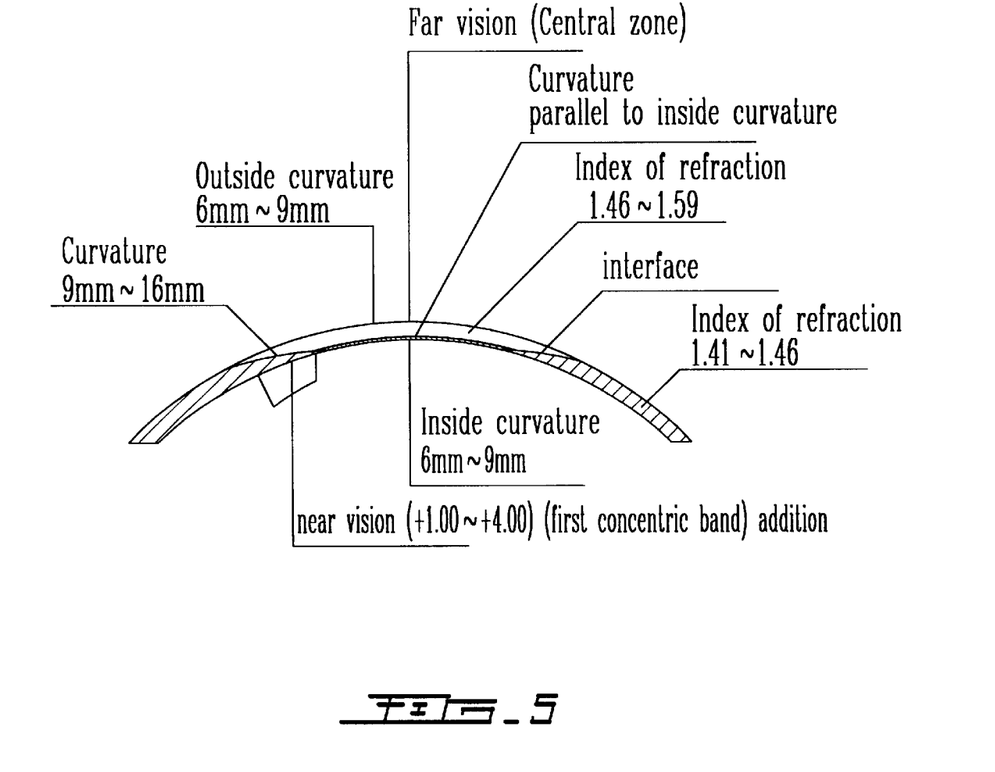
FIG. 5 is a sectional side view of the cut contact lens according to the preferred embodiment.
Figure 6:
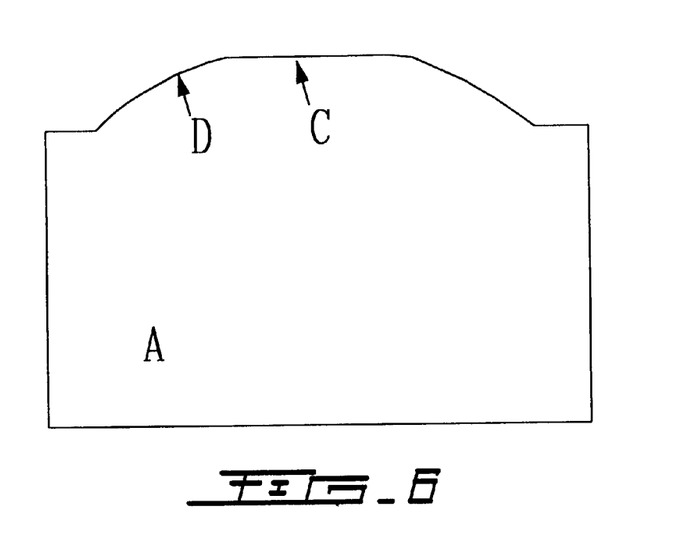
FIG. 6 illustrates a cross-section of a block of polymer material cut to provide a transition surface and a central interface surface according to a first alternative embodiment.
Figure 7:
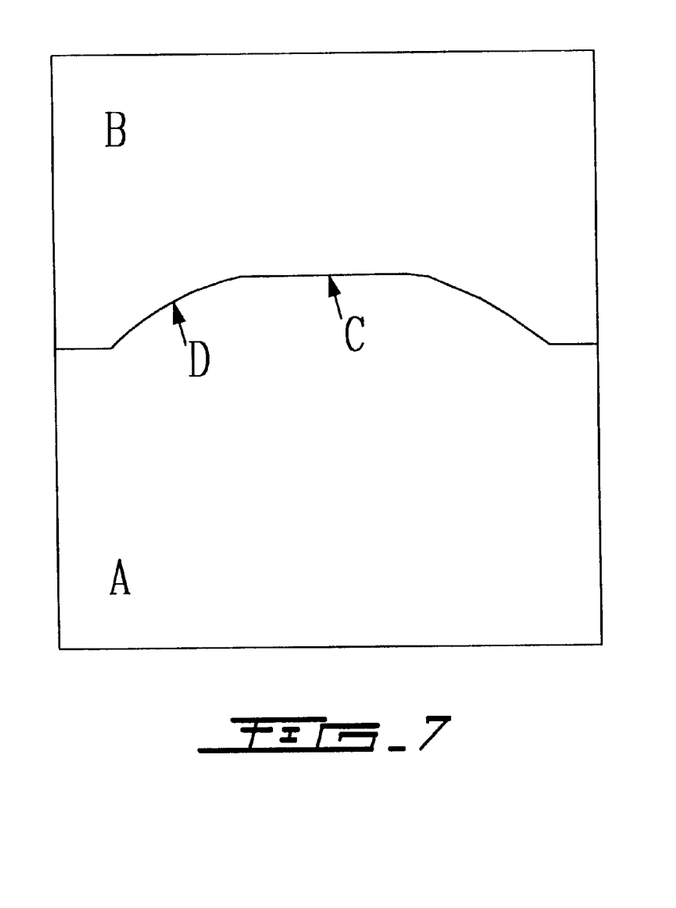
FIG. 7 illustrates the block of FIG. 6 with another block of polymer material having a different index of refraction fused thereto.
Figure 8:
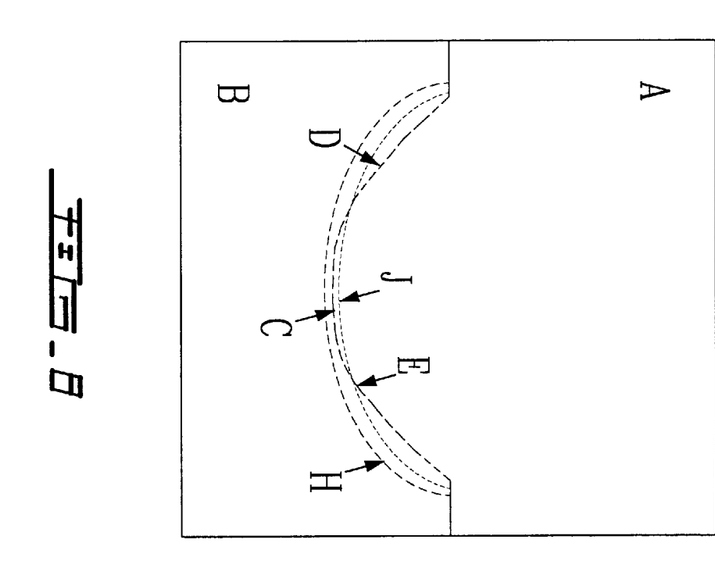
FIG. 8 illustrates a cross-section of the fused block of FIG. 7 with the cross-sectional shape of the final contact lens shown in dotted lines.
Figure 9:
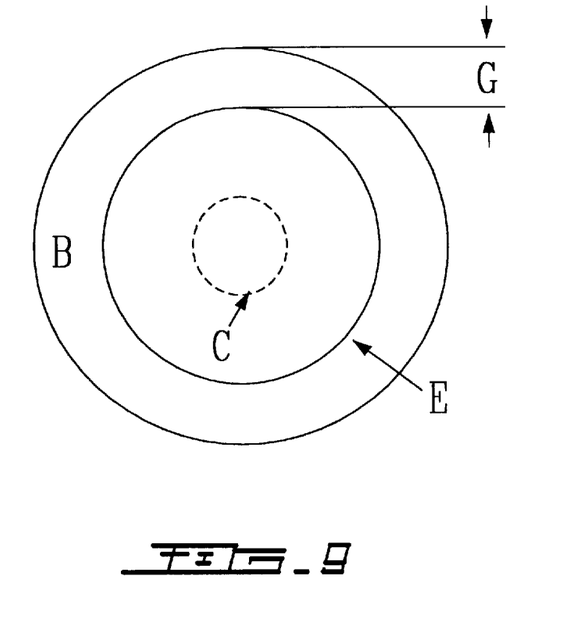
FIG. 9 is a plan view of the cut contact lens according to the first alternative embodiment.
Figure 10:
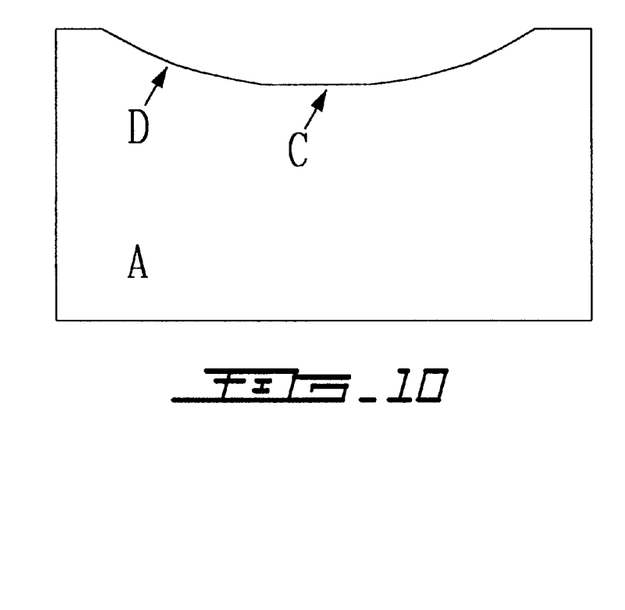
FIG. 10 illustrates a cross-section of a block of polymer material cut to provide a transition surface and a central interface surface according to a second alternative embodiment.
Figure 11:
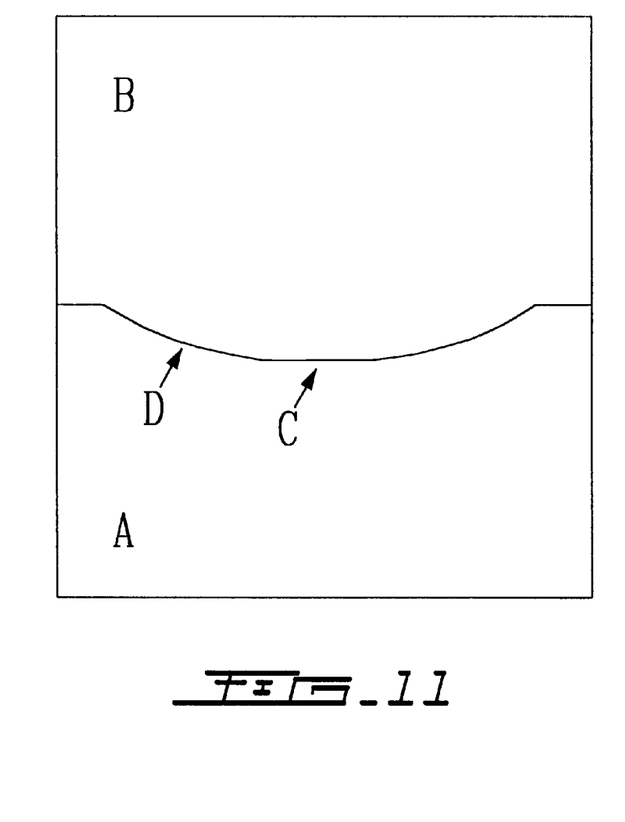
FIG. 11 illustrates the block of FIG. 10 with another block of polymer material having a different index of refraction fused thereto.
Figure 12:
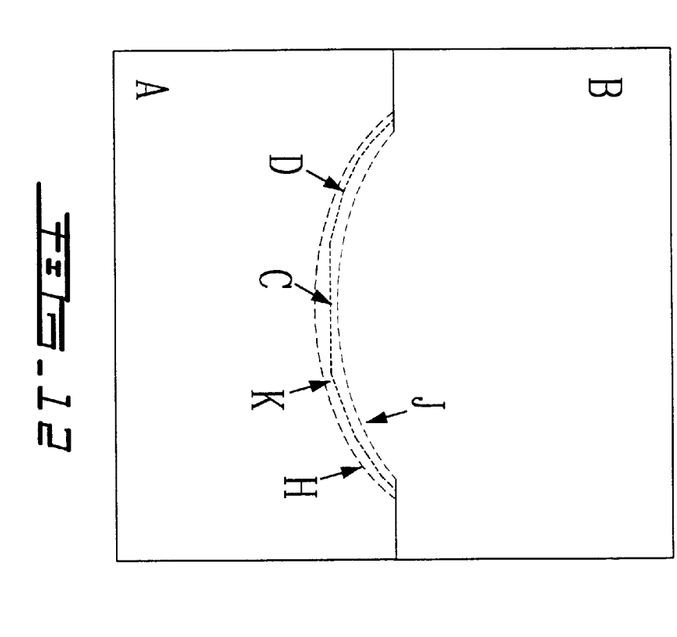
FIG. 12 illustrates a cross-section of the fused block of FIG. 11 with the cross-sectional shape of the final contact lens shown in dotted lines.
Figure 13:
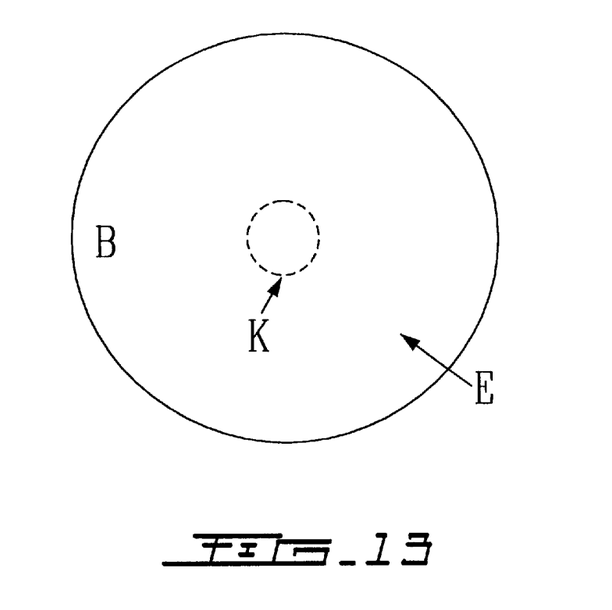
FIG. 13 is a plan view of the cut contact lens according to the second alternative embodiment.

The shape of the surface D is chosen in accordance with the desired transition profile between the central interface C and a peripheral portion of the lens. The profile D, as shown in FIGS. 3 and 4, determines the proportion of polymer from blocks A and B within the concentric band between the central portion C and the junction E. Since the junction E is to be substantially outside the viewing area of the lens, the diameter of the central zone F may be determined by the power required for the first concentric band between C and E.

The contact lens has a constant radius of curvature J on its inside concave surface and a constant radius of curvature on its exterior convex surface H. The curvature of surface J is determined by the shape of the user's eye. The power of the concentric band is thus defined by the difference in the radii of curvature of the surfaces J and H, the two indices of refraction of blocks A and B, as well as the transition profile D.

The junction E is positioned to be substantially outside of the viewing area of the lens (about 5.5 mm in diameter), and thus the zone G shown in FIG. 4 does not contribute to the correction of the user's vision. However, zone G contributes to the mechanical stability of the lens on the user's eye.

In the exemplary preferred embodiment, the diameter F of the central zone is between 3 to 5 mm. With the above-mentioned values for the index of refraction of the blocks A and B, and a curvature of surface J of 8 mm, interface surface will have a curvature of 8 mm as well, while profile D will vary in accordance with the desired power required for the concentric band. For a concentric band having a 1, 2 or 3 addition power, the curvature of D will be 10 mm, 12 mm or 14 mm respectively. The central zone is thus for distance vision and the first concentric band is for near vision (+1 to +4 addition).

Suitable polymers may be selected from the following:

| Polymer Product | Index of Refraction |
| --- | --- |
| Polymethyl methacrylate | 1.49 |
| Polystyrene | 1.59 |
| Methacrylic acid | 1.43 |
| Tetraethylene glycol dimethacrylate | 1.46 |
| 3-[tris(trimethylsilysoxy)silyl]propylmethacrylate | 1.42 |
| Trifluoroethyl methacrylate | 1.36 |
| Hexafluorobutyl methacrylate | 1.36 |
| Hexafluoroisopropyl methacrylate | 1.33 |
| Bis (hexafluoroisopropyl) itaconate | 1.33 |

In the first alternative embodiment, illustrated in FIGS. 6 through 9, the arrangement of the two portions of polymer is, in a way, reversed. The junction between the first and second polymers, E, is on the inside surface of the lens. The central zone C still has curved surfaces J and C with the same curvature and same thickness of the inside central layer of plastic. The power of the central zone is thus define by the curvature of the exterior H and the common curvature of J and C, and the index of the plastic forming the outer layer. The power of the concentric band is defined by the combination of the profile of the interface between the two plastics between E and C, the indices of refraction of the plastics and curvatures J and H.

In the second alternative embodiment, illustrated in FIGS. 10 through 13, the interface between the two plastics extends over the whole lens. Curve D is parallel to curve J outside of the central zone, and this allows the power of the concentric band to be defined by index of refraction of the outer plastic and the difference in curvatures D,J and H. At point K, the interface profile changes, and has a shape within the central zone to provide the different power of the central zone. This is done without changing the profile of the lens at J or H.

It will be apparent to those skilled in the art that other polymers and mixtures thereof are possible to provide desirable index of refraction, wetability and mechanical properties.

What is claimed is:

1. A fused multi-focal contact lens comprising:
   a first portion having a first index of refraction;
   a second portion fused to the first portion and having a second index of refraction different from said first index of refraction, wherein:
      said lens comprises a central zone providing a first optic power and a first concentric band providing a second optic power;
      a central interface between said first portion and said second portion within said central zone having a curvature substantially the same as a curvature of said concave side such that a thickness of one of said first and second portions is substantially constant, whereby the mechanical properties of said lens are more stable;

said second portion forms a junction with said first portion substantially outside of a field of view of a user's eye; and a transition profile between said junction and said central interface determines, along with said first and said second indices of refraction, said second optic power.

2. The contact lens as claimed in claim 1, wherein said first portion extending from a periphery of said lens over a concave side of said lens, said junction being on a convex side of said lens.

3. The contact lens as claimed in claim 2, wherein said transition profile is curved according to a radius of curvature.

4. The contact lens as claimed in claim 3, wherein said thickness of said first portion within said central zone is approximately 0.05 mm.

5. The contact lens as claimed in claim 2, wherein said thickness of said first portion within said central zone is approximately 0.05 mm.

6. The contact lens as claimed in claim 2, wherein said concave side and said convex side of said lens each have a continuous curvature.

7. The contact lens as claimed in claim 3, wherein said concave side and said convex side of said lens each have a continuous curvature.

8. The contact lens as claimed in claim 4, wherein said concave side and said convex side of said lens each have a continuous curvature.

9. The contact lens as claimed in claim 1, wherein said concave side and said convex side of said lens each have a continuous curvature.

10. A fused multi-focal contact lens comprising:
    a first portion having a first index of refraction;
    a second portion fused to the first portion and having a second index of refraction different from said first index of refraction, wherein:
        said lens comprises a central zone providing a first optic power and a first concentric band providing a second optic power;
        an interface between said first portion and said second portion extending substantially across all of said lens and having within said concentric band a curvature substantially the same as a curvature of said concave side such that a thickness of one of said first and second portions is substantially constant, whereby the mechanical properties of said lens are more stable;
        said interface having a change in curvature at a junction between said central zone and said concentric band wherein a profile of said interface within said central zone determines, along with said first and said second indices of refraction, said first optic power.

11. The contact lens as claimed in claim 10, wherein a curvature of said lens on a convex side of said lens is substantially continuous across said central zone and said concentric zone.

* * * * *

UNITED STATES PATENT AND TRADEMARK OFFICE
CERTIFICATE OF CORRECTION

PATENT NO. : 6,733,125 B2  
DATED : May 11, 2004  
INVENTOR(S) : André Bérubé et al.

It is certified that error appears in the above-identified patent and that said Letters Patent is hereby corrected as shown below:

<u>Title page,</u>  
Item [73], Assignee, delete in its entirety

Signed and Sealed this

Twentieth Day of July, 2004

JON W. DUDAS  
*Acting Director of the United States Patent and Trademark Office*